July 28, 1931.    A. MITTASCH ET AL    1,816,122
MANUFACTURE OF IRON CARBONYL
Filed Feb. 6, 1926
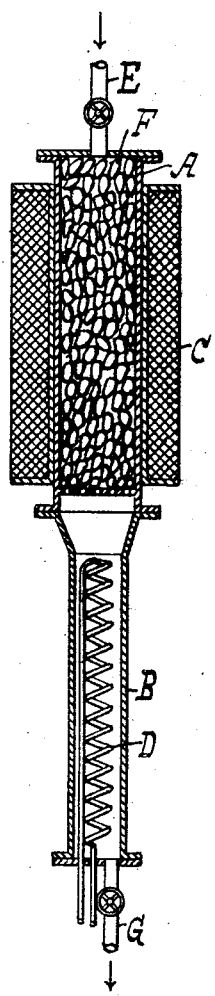
Alvin Mittasch
Carl Müller
INVENTORS Patented July 28, 1931

1,816,122

UNITED STATES PATENT OFFICE

ALWIN MITTASCH, OF LUDWIGSHAFEN-ON-THE-RHINE, AND CARL MÜLLER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF IRON CARBONYL

Application filed February 6, 1926, Serial No. 86,650, and in Germany February 9, 1925.

It is already known that iron carbonyl can be obtained by acting with carbon monoxid on finely divided iron at elevated temperatures and preferably under elevated pressure. During the operation of the process, the pressure falls as the carbon monoxid reacts with the iron, and it is therefore advantageous to maintain the pressure at a certain height by means of the addition of fresh carbon monoxid. After rather a short time, however, the pressure falls no longer and the reaction ceases long before all the iron is consumed. This cessation of the reaction is caused by a layer of liquid iron carbonyl becoming deposited on the iron which prevents the carbon monoxid practically entirely from gaining any further access to the iron. In order to cause the carbon monoxid further to react with the iron, it is necessary to release the carbon monoxid contained in the reaction vessel, to distil the iron carbonyl away by heating to higher temperatures and then to restart the operation by forcing the carbon monoxid into the vessel and proceeding in the usual manner.

We have now found that the interruptions above referred to, owing to which much time is wasted and trouble caused especially when working under high pressure, can be avoided in a simple manner and the process carried on continuously until all the iron is consumed, by connecting the reaction vessel with a receptacle maintained at a lower temperature, but preferably under the same pressure. In this receptacle the iron carbonyl contained in the gas is separated in the liquid or solid state depending on the temperature and can be removed therefrom continuously or from time to time. By making the difference of the temperatures in the two vessels as great as possible and the connection between the two vessels wide and short, the undesirable deposit of iron carbonyl on the iron is avoided practically completely, and by this means iron carbonyl is formed continuously and fresh carbon monoxid can be fed in until all the iron in the reaction vessel is consumed.

The receptacle for condensation may be constructed in any desired manner. It may be cooled externally or provided with cooling pipes in which the liquid or gas used for cooling is preferably maintained under the same pressure as the gases in the said receptacle in order to allow the use of thin walled pipes which permit of a good exchange of heat. Under certain conditions any special cooling device may be entirely dispensed with. Generally, the receptacle vessel is so arranged with relation to the reaction vessel that any liquid carbonyl which may already have condensed on the iron mass can be run off into the said condensation receptacle. It is also possible to use the lower part of the reaction vessel as a receptacle for the liquid iron carbonyl if kept cool and preferably empty and being provided with a valve or other device for removing the liquid product.

The accompanying diagrammatic drawing illustrates in vertical section an apparatus suitable for carrying out our invention, but any other form of suitable apparatus may also be employed.

A reaction vessel A which is surrounded by a heating device C contains the iron mass F. Through the valve E carbon monoxide is introduced into the reaction vessel. The iron carbonyl formed is condensed in the cooling chamber B, which is kept at a low temperature by means of a coil D which is cooled with cold brine, and is withdrawn therefrom continuously or from time to time by the tap G.

We claim:

1. The process of producing iron carbonyl which comprises reacting iron and carbon monoxide in a closed vessel at an elevated temperature, and permitting the iron carbonyl formed to diffuse into a contiguous cooled zone in communication with said vessel, while supplying additional carbon monoxide under pressure sufficient to maintain a substantially constant elevated pressure in the vessel and the cooled zone.

2. The process of producing iron carbonyl which comprises reacting iron and carbon monoxide in a closed vessel at an elevated temperature, and permitting the iron carbonyl formed to diffuse into a contiguous cooled zone in communication below said vessel, while supplying additional carbon monoxide under pressure sufficient to maintain a substantially constant elevated pressure in the vessel and the cooled zone, and removing liquid iron carbonyl from the cooled zone.

In testimony whereof we have hereunto set our hands.

ALWIN MITTASCH.
CARL MÜLLER.